(12) United States Patent
Kawashima

(10) Patent No.: US 6,459,236 B2
(45) Date of Patent: Oct. 1, 2002

(54) CELL BALANCE ADJUSTING CIRCUIT, ABNORMAL CELL VOLTAGE DETECTING CIRCUIT, METHOD OF ADJUSTING CELL BALANCE, AND METHOD OF DETECTING ABNORMAL CELL VOLTAGE

(75) Inventor: Shingo Kawashima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/739,892

(22) Filed: Dec. 20, 2000

(30) Foreign Application Priority Data

Dec. 20, 1999 (JP) .......................................... 11-360832

(51) Int. Cl.[7] .................................................. H02J 7/00
(52) U.S. Cl. ...................................................... 320/118
(58) Field of Search .......................................... 320/118

(56) References Cited

U.S. PATENT DOCUMENTS 5,814,970 A * 9/1998 Schmidt ..................... 320/118

FOREIGN PATENT DOCUMENTS

| JP | 11-098698 | * | 4/1999 |
| JP | 11-146570 | * | 5/1999 |

* cited by examiner

Primary Examiner—Edward H. Tso
Assistant Examiner—Pia Tibbits
(74) Attorney, Agent, or Firm—Young & Thompson

(57) ABSTRACT

A cell balance adjusting circuit includes a series connection of basic cells; and a voltage holder connected through a switching circuit to individual terminals of the basic cells, wherein the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning.

18 Claims, 9 Drawing Sheets

FIG. 2

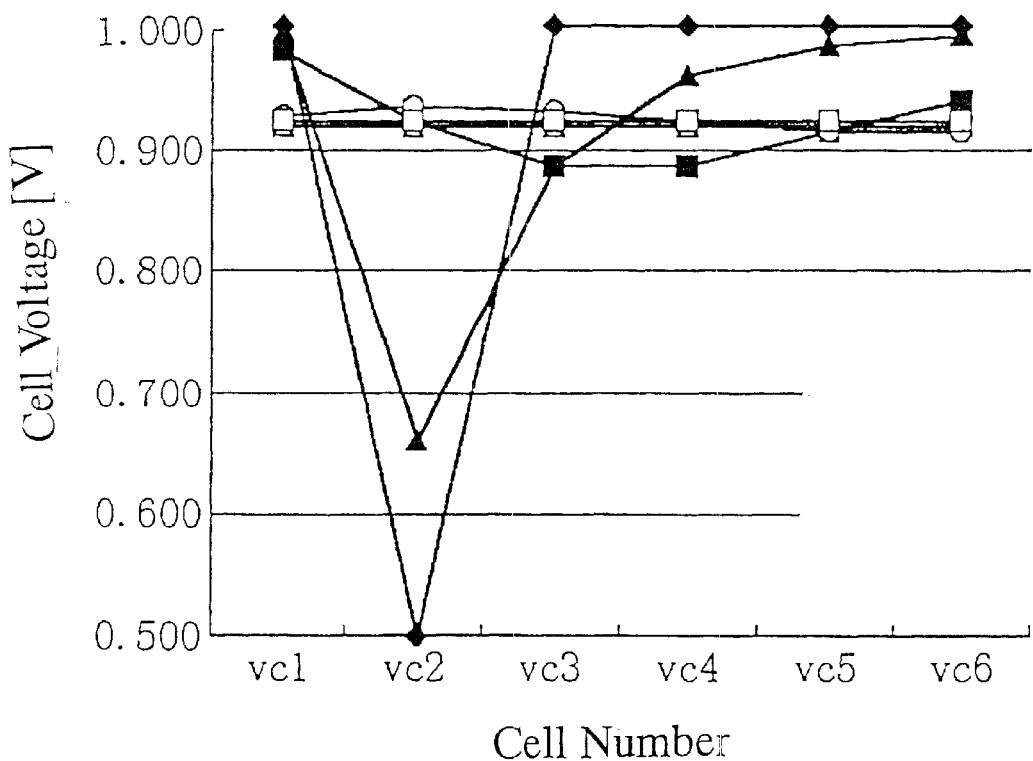

◆ before the unidirectional sequential scanning of the switching operation is made.

▲ after one cycle of the unidirectional sequential scanning of the switching operation has been made.

■ after five cycles of the unidirectional sequential scanning of the switching operation has been made.

○ after ten cycles of the unidirectional sequential scanning of the switching operation has been made.

△ after twenty cycles of the unidirectional sequential scanning of the switching operation has been made.

□ after thirty cycles of the unidirectional sequential scanning of the switching operation has been made.

CELL BALANCE ADJUSTING CIRCUIT, ABNORMAL CELL VOLTAGE DETECTING CIRCUIT, METHOD OF ADJUSTING CELL BALANCE, AND METHOD OF DETECTING ABNORMAL CELL VOLTAGE

BACKGROUND OF THE INVENTION

The present invention relates to a cell balance adjusting circuit, an abnormal cell voltage detecting circuit, a method of adjusting a cell balance and a method of detecting an abnormal cell voltage, and more particularly to a cell balance adjusting circuit for adjusting a balance between cells connected in series in an application circuit having combined secondary batteries with a simple control circuit configuration.

A conventional technique for charging combined secondary batteries such as lithium batteries will be described. FIG. 1 is a circuit diagram illustrative of a conventional circuit for charging combined secondary batteries such as lithium batteries. A series connection of first to sixth battery cells CE1, CE2, CE3, CE4, CE5 and CE6 is connected between a charging circuit 100 and a ground line. A voltage monitoring control circuit 200 is also provided. A first side of the first battery cell CE1 is connected to the charging circuit 100. The first side of the first battery cell CE1 is further connected through a first series connection of a first switch S1 and a first resistance R1 and also through a first by-pass to the voltage monitoring control circuit 200. A second side of the first battery cell CE1 is connected to a first side of the second battery cell CE2. The second side of the first battery cell CE1 and the first side of the second battery cell CE2 are further connected through a second series connection of a second switch S2 and a second resistance R2 and also through a second by-pass to the voltage monitoring control circuit 200. A second side of the second battery cell CE2 is connected to a first side of the third battery cell CE3. The second side of the second battery cell CE2 and the first side of the third battery cell CE3 are further connected through a third series connection of a third switch S3 and a third resistance R3 and also through a third by-pass to the voltage monitoring control circuit 200. A second side of the third battery cell CE3 is connected to a first side of the fourth battery cell CE4. The second side of the third battery cell CE3 and the first side of the fourth battery cell CE4 are further connected through a fourth series connection of a fourth switch S4 and a fourth resistance R4 and also through a fourth by-pass to the voltage monitoring control circuit 200. A second side of the fourth battery cell CE4 is connected to a first side of the fifth battery cell CE5. The second side of the fourth battery cell CE4 and the first side of the fifth battery cell CE5 are further connected through a fifth series connection of a fifth switch S5 and a fifth resistance R5 and also through a fifth by-pass to the voltage monitoring control circuit 200. A second side of the fifth battery cell CE5 is connected to a first side of the sixth battery cell CE6. The second side of the fifth battery cell CE5 and the first side of the sixth battery cell CE6 are further connected through a sixth series connection of a sixth switch S6 and a sixth resistance R6 and also through a sixth by-pass to the voltage monitoring control circuit 200. A second side of the sixth battery cell CE6 is connected to the ground line. The first series connection of the first switch S1 and the first resistance R1 is connected between the first and second side of the first battery cell CE1. The second series connection of the second switch S9 and the second resistance R2 is connected between the first and second side of the second battery cell CE2. The third series connection of the third switch S3 and the third resistance R3 is connected between the first and second side of the third battery cell CE3. The fourth series connection of the fourth switch S4 and the fourth resistance R4 is connected between the first and second side of the fourth battery cell CE4. The fifth series connection of the fifth switch S5 and the fifth resistance R5 is connected between the first and second side of the fifth battery cell CE5. The sixth series connection of the sixth switch S6 and the sixth resistance R6 is connected between the first and second side of the sixth battery cell CE6.

The voltage monitoring control circuit 200 monitors individual voltages of the first to sixth battery cells in the charge process. If one of the battery cells is completely charged up, then a charge current is by-passed to the corresponding resistance, whilst the remaining battery cells are continued to be charged.

In this case, the cell balance adjustment is made only in the charging process. If the capacitance balance of the cells is imperfect or lost, a dischargeable power in the discharge process is limited by a minimum cell capacity in the battery cells. This means that the large capacity cells show imperfect discharge. Namely, an unnecessary power is consumed in the charging process, and further the perfect discharge of the charged up power is difficult.

In order to have solved the above problem, the following conventional technique has been proposed, which is disclosed in Japanese laid-open patent publications Nos. 11-146570 and 11-098698. In the charging and discharging processes, a voltage across terminals of each cell is measured, so that two cells are selected on the basis of the measured voltage values. A charge accumulation device such as the capacitor is connected in parallel to first one of the selected two cells before this connected is switched into that the charge accumulation device is connected in parallel to second one of the selected two cells. This processes will be repeated to reduce the difference in voltage between the selected two cells.

Subsequently, the cell voltage is measured and then the above switching processes will further be repeated to take a balance among the individual cells. The use of the voltage judging circuit enables that the selected two cells have almost the same voltage. The voltage measuring operations will be repeated to adjust the voltage balances among the plural cells.

The conventional balance adjusting circuit using the charge accumulation device is thus capable of adjustment to the cell balance in the charge and discharge processes. The conventional balance adjusting circuit using the charge accumulation device, however, has the following problems.

The first problem is as follows. To select the two cells to be connected in parallel, it is necessary to measure the cell terminal voltages every times for judgement. The judgement and control circuit is made complicated. Particularly, in case of the large number of the battery cells connected in series, a large withstand voltage of the voltage measuring circuit is necessary.

A battery to be used for a hybrid car shows a high output voltage of 240V. In order to measure the cell voltage for judgement, the circuit is required to have an extremely high withstand voltage. This makes increased a cost or a price of the circuit.

To obtain a driving energy for the hybrid car, a high voltage is necessary. A responsible IC with a high withstand voltage for measuring and judgement to the voltage is expensive.

The second problem is as follows. Under the high voltage conditions, an averaged voltage difference between the comparing cells is about 1.2V if the cells are nickel hydrogen battery. The averaged voltage difference between the comparing cells is only 3.62V if the cells are lithium secondary battery. An accuracy in a few milli-voltage order is necessary to detect the voltage difference. Higher voltages in the range of 240V to 280V are used for the hybrid cars, electric cars and fuel battery cells. In such high voltage level, the accuracy in a few milli-voltage order is necessary for the circuit to detect the voltage difference. The circuit having such the high accuracy is expensive.

A large number of the small voltage cells is connected in series, for example, several tends to a few hundreds, so that a potential voltage from the ground level is 240V. This means that an extremely high d.c. voltage is applied to the circuit. By contrast, a voltage level for taking the balance between the cells is based on the low voltage level, for example, 1.2V or 3.6V. The accuracy in a few milli-voltage order is necessary for the circuit to detect the voltage difference. This means that the accuracy in ppm-order is necessary for the circuit to detect the voltage difference. Namely, the circuit is required to have the high withstand voltage and the high accuracy.

In the above circumstances, it had been required to develop a novel cell balance adjusting circuit, an abnormal cell voltage detecting circuit, a method of adjusting a cell balance and a method of detecting an abnormal cell voltage free from the above problem.

SUMMARY OF THE INVENTION

Accordingly, it is an object of the present invention to provide a novel cell balance adjusting circuit free from the above problems.

It is a further object of the present invention to provide a novel cell balance adjusting circuit with a simple circuit configuration and being capable of stably taking a highly accurate balance of a large number of series-connected battery cells having high output voltages.

It is a still further object of the present invention to provide a novel cell balance adjusting circuit which is not expensive.

It is yet a further object of the present invention to provide a novel cell voltage detecting circuit free from the above problems.

It is a further object of the present invention to provide a novel cell voltage detecting circuit with a simple circuit configuration and being capable of stably taking a highly accurate balance of a large number of series-connected battery cells having high output voltages.

It is a still further object of the present invention to provide a novel cell voltage detecting circuit which is not expensive.

It is yet a further object of the present invention to provide a novel method of adjusting a cell balance free from the above problems.

It is a further object of the present invention to provide a novel method of adjusting a cell balance with a simple circuit configuration and stably taking a highly accurate balance of a large number of series-connected battery cells having high output voltages.

It is a still further object of the present invention to provide a novel method of adjusting a cell balance at a low cost.

It is yet a further object of the present invention to provide a novel method of detecting a cell voltage free from the above problems.

It is a further object of the present invention to provide a novel method of detecting a cell voltage with a simple circuit configuration and stably taking a highly accurate balance of a large number of series-connected battery cells having high output voltages.

It is a still further object of the present invention to provide a novel method of detecting a cell voltage at a low cost.

In accordance with the present invention, a cell balance adjusting circuit comprises: a series connection of basic cells; and a voltage holder connected through a switching circuit to individual terminals of the basic cells, wherein the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 2 is a diagram illustrative of the individual cell voltage levels through the cyclic processes of the unidirectional sequential scanning of the switching operation in accordance with the present invention.

DISCLOSURE OF THE INVENTION

Figure 1:
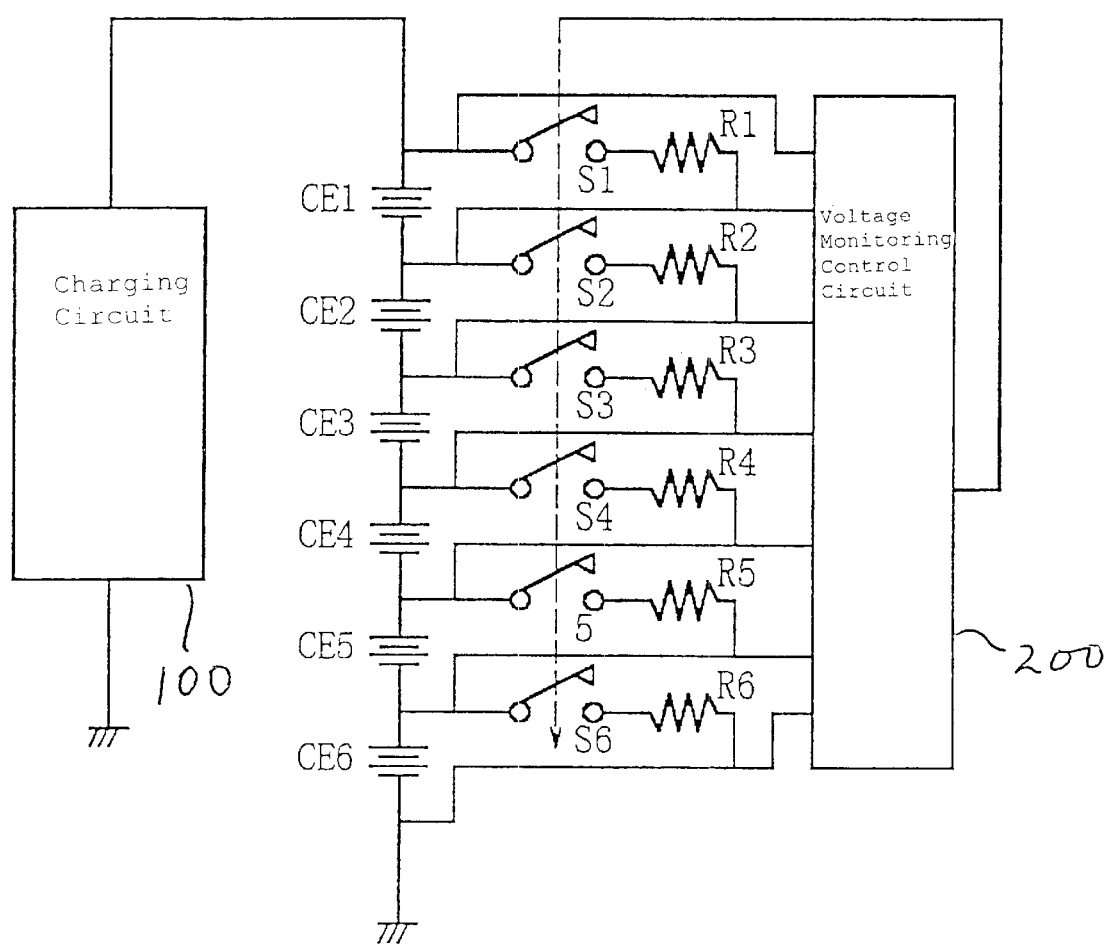
FIG. 1 is a circuit diagram illustrative of a conventional circuit for charging combined secondary batteries such as lithium batteries.

In accordance with the present invention, a cell balance adjusting circuit comprises: a series connection of basic cells; and a voltage holder connected through a switching circuit to individual terminals of the basic cells, wherein the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning.

It is preferable that the switching circuit comprises plural switching elements and a control circuit for controlling individual switching operations of the switching elements.

It is further preferable that each of the switching elements comprises a switching transistor.

It is also preferable that each of the switching elements comprises a mechanical switch.

It is also preferable that the voltage holder comprises a capacitor.

It is also preferable that the voltage holder comprises a secondary battery cell having the same structure as the basics cells.

The switching circuit shows a switching operation to provide a parallel connection between an intermediate point between adjacent two of the basic cells and the voltage holder, so that individual voltages of the intermediate point between adjacent two of the basic cells and the voltage holder are converged into a voltage depending upon the individual voltages and individual capacitances of the intermediate point and of the voltage holder. If the individual capacitances of the intermediate point and of the voltage holder are the same, then the individual voltages of the intermediate point between adjacent two of the basic cells and the voltage older are converged into an averaged voltage of the individual voltages. If the individual capacitances of the intermediate point and of the voltage holder are different from each other, then the individual voltages of the intermediate point between adjacent two of the basic cells and the voltage holder are converged into a voltage depending upon the ratio in capacitance of the intermediate point between adjacent two of the basic cells and the voltage holder.

The switching circuit shows a unidirectional sequential scanning of the switching operation to all of the basic cells, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the basic cells. As a result, the cell balance adjustment is realized. FIG. 2 is a diagram illustrative of the individual cell voltage levels through the cyclic processes of the unidirectional sequential scanning of the switching operation in accordance with the present invention. ♦ represents the individual cell voltage levels before the unidirectional sequential scanning of the switching operation is made. ▼ represents the individual cell voltage levels after one cycle of the unidirectional sequential scanning of the switching operation has been made, ■ represents the individual cell voltage levels after five cycles of the unidirectional sequential scanning of the switching operation has been made. ○ represents the individual cell voltage levels after ten cycles of the unidirectional sequential scanning of the switching operation has been made. △ represents the individual cell voltage levels after twenty cycles of the unidirectional sequential scanning of the switching operation has been made. ▭ represents the individual cell voltage levels after thirty cycles of the unidirectional sequential scanning of the switching operation has been made. As the number of the cycle of the unidirectional sequential scanning of the switching operation is increased, then the individual voltages of the intermediate point between adjacent two of the basic cells and the voltage holder are converged into a voltage of 0.92V. Further, the control circuit for controlling the switching circuit may comprise a simple sequential circuit such as a shift register. This allows the manufacturing cost of the circuit to be low.

A cell voltage detecting circuit comprises a cell balance adjusting circuit; and a voltage detecting judging circuit, wherein the cell balance adjusting circuit further comprises: a series connection of basic cells; and a voltage holder connected through a switching circuit to individual terminals of the basic cells, wherein the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning; and the voltage detecting judging circuit has a switching device connected to the voltage holder, wherein the switching device connects the voltage holder and the voltage detecting judging circuit to enable the voltage detecting judging circuit to detect a voltage of the voltage holder after one parallel connection between the basic cells and the voltage holder has been disconnected and before other parallel connection between the basic cells and the voltage holder is made.

It is preferable that the switching device has a higher withstand voltage than the switching circuit.

It is preferable that the switching circuit comprises plural switching elements and a control circuit for controlling individual switching operations of the switching elements.

It is further preferable that each of the switching elements comprises a switching transistor.

It is also preferable that each of the switching elements comprises a mechanical switch.

It is also preferable that the voltage holder comprises a capacitor.

It is also preferable that the voltage holder comprises a secondary battery cell having the same structure as the basics cells.

The switching circuit shows a switching operation to provide a parallel connection between an intermediate point between adjacent two of the basic cells and the voltage holder, so that individual voltages of the intermediate point between adjacent two of the basic cells and the voltage holder are converged into a voltage depending upon the individual voltages and individual capacitances of the intermediate point and of the voltage holder. If the individual capacitances of the intermediate point and of the voltage holder are the same, then the individual voltages of the intermediate point between adjacent two of the basic cells and the voltage holder are converged into an averaged voltage of the individual voltages. If the individual capacitances of the intermediate point and of the voltage holder are different from each other, then the individual voltages of the intermediate point between adjacent two of the basic cells and the voltage holder are converged into a voltage depending upon the ratio in capacitance of the intermediate point between adjacent two of the basic cells and the voltage holder.

The switching circuit shows a unidirectional sequential scanning of the switching operation to all of the basic cells, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the basic cells. As a result, the cell balance adjustment is realized. FIG. 2 is a diagram illustrative of the individual cell voltage levels through the cyclic processes of the unidirectional sequential scanning of the switching operation in accordance with the present invention. ♦ represents the individual cell voltage levels before the unidirectional sequential scanning of the switching operation is made. ▼ represents the individual cell voltage levels after one cycle of the unidirectional sequential scanning of the switching operation has been made. ■ represents the individual cell voltage levels after five cycles of the unidirectional sequential scanning of the switching operation has been made. ○ represents the individual cell voltage levels after ten cycles of the unidirectional sequential scanning of the switching operation has been made. Δ represents the individual cell voltage levels after twenty cycles of the unidirectional sequential scanning of the switching operation has been made. ▢ represents the individual cell voltage levels after thirty cycles of the unidirectional sequential scanning of the switching operation has been made. As the number of the cycle of the unidirectional sequential scanning of the switching operation is increased, then the individual voltages of the intermediate point between adjacent two of the basic cells and the voltage holder are converged into a voltage of 0.92V. Further, the control circuit for controlling the switching circuit may comprise a simple sequential circuit such as a shift register. This allows the manufacturing cost of the circuit to be low.

Further, the voltage detecting judging circuit has a switching device connected to the voltage holder, where the switching device connects the voltage holder and the voltage detecting judging circuit to enable the voltage detecting judging circuit to detect a voltage of the voltage holder after one parallel connection between the basic cells and the voltage holder has been disconnected and before other parallel connection between the basic cells and the voltage holder is made. This means that the voltage detecting judging circuit having the lower withstand voltage is usable for detecting the voltages which are proportional to the individual voltages of the basic cells without detecting the total high voltage level of the series connected basic cells. The voltage detecting judging circuit is not required to have the high withstand voltage. This allows the voltage detecting judging circuit to be inexpensive.

Furthermore, the switching device has a higher withstand voltage than the switching circuit, so as to electrically isolate the voltage detecting judging circuit from the high voltage of the series connection of the basic cells. This allows the voltage detecting judging circuit to have the relatively low withstand voltage and thus the inexpensive voltage detecting judging circuit can be realized.

In accordance with the present invention, a method of adjusting a cell balance of series-connected basic cells having individual terminals connected through a switching circuit to a voltage holder comprises the steps of: a switching operation to provide a parallel connection between an intermediate point between adjacent two of the basic cells and the voltage holder; a unidirectional sequential scanning of the switching operation to all of the basic cells; and repeating the unidirectional sequential scanning.

It is preferable that the switching circuit is used which comprises plural switching elements and a control circuit for controlling individual switching operations of the switching elements.

It is further preferable that each of the switching elements is used which comprises a switching transistor.

It is also preferable that each of the switching elements is used which comprises a mechanical switch.

It is also preferable that the voltage holder is used which comprises a capacitor.

It is also preferable that the voltage holder is used which comprises a secondary battery cell having the same structure as the basics cells.

The switching circuit shows a switching operation to provide a parallel connection between an intermediate point between adjacent two of the basic cells and the voltage holder, so that individual voltages of the intermediate point between adjacent two of the basic cells and the voltage holder are converged into a voltage depending upon the individual voltages and individual capacitances of the intermediate point and of the voltage holder. If the individual capacitances of the intermediate point and of the voltage holder are the same, then the individual voltages of the intermediate point between adjacent two of the basic cells and the voltage holder are converged into an averaged voltage of the individual voltages. If the individual capacitances of the intermediate point and of the voltage holder are different from each other, then the individual voltages of the intermediate point between adjacent two of the basic cells and the voltage holder are converged into a voltage depending upon the ratio in capacitance of the intermediate point between adjacent two of the basic cells and the voltage holder.

The switching circuit shows a unidirectional sequential scanning of the switching operation to all of the basic cells, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the basic cells. As a result, the cell balance adjustment is realized. FIG. 2 is a diagram illustrative of the individual cell voltage levels through the cyclic processes of the unidirectional sequential scanning of the switching operation in accordance with the present invention. ♦ represents the individual cell voltage levels before the unidirectional sequential scanning of the switching operation is made. ▼ represents the individual cell voltage levels after one cycle of the unidirectional sequential scanning of the switching operation has been made. ■ represents the individual cell voltage levels after five cycles of the unidirectional sequential scanning of the switching operation has been made. ○ represents the individual cell voltage levels after ten cycles of the unidirectional sequential scanning of the switching operation has been made. Δ represents the individual cell voltage levels after twenty cycles of the unidirectional sequential scanning of the switching operation has been made. ▢ represents the individual cell voltage levels after thirty cycles of the unidirectional sequential scanning of the switching operation has been made. As the number of the cycle of the unidirectional sequential scanning of the switching operation is increased, then the individual voltages of the intermediate point between adjacent two of the basic cells and the voltage holder are converged into a voltage of 0.92V. Further, the control circuit for controlling the switching circuit may comprise a simple sequential circuit such as a shift register. This allows the manufacturing cost of the circuit to below.

A method of detecting a cell voltage by use of a cell balance adjusting circuit; and a voltage detecting judging circuit, wherein the cell balance adjusting circuit further comprises: a series connection of basic cells; and a voltage holder connected through a switching circuit to individual terminals of the basic cells, and the voltage detecting judging circuit has a switching device connected to the voltage holder, comprises the steps of: a switching operation to provide a parallel connection between an intermediate point between adjacent two of the basic cells and the voltage holder; a unidirectional sequential scanning of the switching operation to all of the basic cells; repeating the unidirectional sequential scanning; and wherein the switching device connects the voltage holder and the voltage detecting judging circuit to enable the voltage detecting judging circuit to detect a voltage of the voltage holder after one parallel connection between the basic cells and the voltage holder has been disconnected and before other parallel connection between the basic cells and the voltage holder is made.

It is preferable that the switching device has a higher withstand voltage than the switching circuit.

It is preferable that the switching circuit is used which comprises plural switching elements and a control circuit for controlling individual switching operations of the switching elements.

It is further preferable that each of the switching elements is used which comprises a switching transistor.

It is also preferable that each of the switching elements is used which comprises a mechanical switch.

It is also preferable that the voltage holder is used which comprises a capacitor.

It is also preferable that the voltage holder is used which comprises a secondary battery cell having the same structure as the basics cells.

The switching circuit shows a switching operation to provide a parallel connection between an intermediate point between adjacent two of the basic cells and the voltage holder, so that individual voltages of the intermediate point between adjacent two of the basic cells and the voltage holder are converged into a voltage depending upon the individual voltages and individual capacitances of the intermediate point and of the voltage holder. If the individual capacitances of the intermediate point and of the voltage holder are the same, then the individual voltages of the intermediate point between adjacent two of the basic cells and the voltage holder are converged into an averaged voltage of the individual voltages. If the individual capacitances of the intermediate point and of the voltage holder are different from each other, then the individual voltages of the intermediate point between adjacent two of the basic cells and the voltage holder are converged into a voltage depending upon the ratio in capacitance of the intermediate point between adjacent two of the basic cells and the voltage holder.

The switching circuit shows a unidirectional sequential scanning of the switching operation to all of the basic cells, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the basic cells. As a result, the cell balance adjustment is realized. FIG. 2 is a diagram illustrative of the individual cell voltage levels through the cyclic processes of the unidirectional sequential scanning of the switching operation in accordance with the present invention. ♦ represents the individual cell voltage levels before the unidirectional sequential scanning of the switching operation is made. ▼ represents the individual cell voltage levels after one cycle of the unidirectional sequential scanning of the switching operation has been made. ■ represents the individual cell voltage levels after five cycles of the unidirectional sequential scanning of the switching operation has been made. ○ represents the individual cell voltage levels after ten cycles of the unidirectional sequential scanning of the switching operation has been made. △ represents the individual cell voltage levels after twenty cycles of the unidirectional sequential scanning of the switching operation has been made. ☐ represents the individual cell voltage levels after thirty cycles of the unidirectional sequential scanning of the switching operation has been made. As the number of the cycle of the unidirectional sequential scanning of the switching operation is increased, then the individual voltages of the intermediate point between adjacent two of the basic cells and the voltage holder are converged into a voltage of 0.92V. Further, the control circuit for controlling the switching circuit may comprise a simple sequential circuit such as a shift register. This allows the manufacturing cost of the circuit to be low.

Further, the voltage detecting judging circuit has a switching device connected to the voltage holder, where the switching device connects the voltage holder and the voltage detecting judging circuit to enable the voltage detecting judging circuit to detect a voltage of the voltage holder after one parallel connection between the basic cells and the voltage holder has been disconnected and before other parallel connection between the basic cells and the voltage holder is made. This means that the voltage detecting judging circuit having the lower withstand voltage is usable for detecting the voltages which are proportional to the individual voltages of the basic cells without detecting the total high voltage level of the series connected basic cells. The voltage detecting judging circuit is not required to have the high withstand voltage. This allows the voltage detecting judging circuit to be inexpensive.

Furthermore, the switching device has a higher withstand voltage than the switching circuit, so as to electrically isolate the voltage detecting judging circuit from the high voltage of the series connection of the basic cells. This allows the voltage detecting judging circuit to have the relatively low withstand voltage and thus the inexpensive voltage detecting judging circuit can be realized.

PREFERRED EMBODIMENT

First Embodiment

Figure 3:
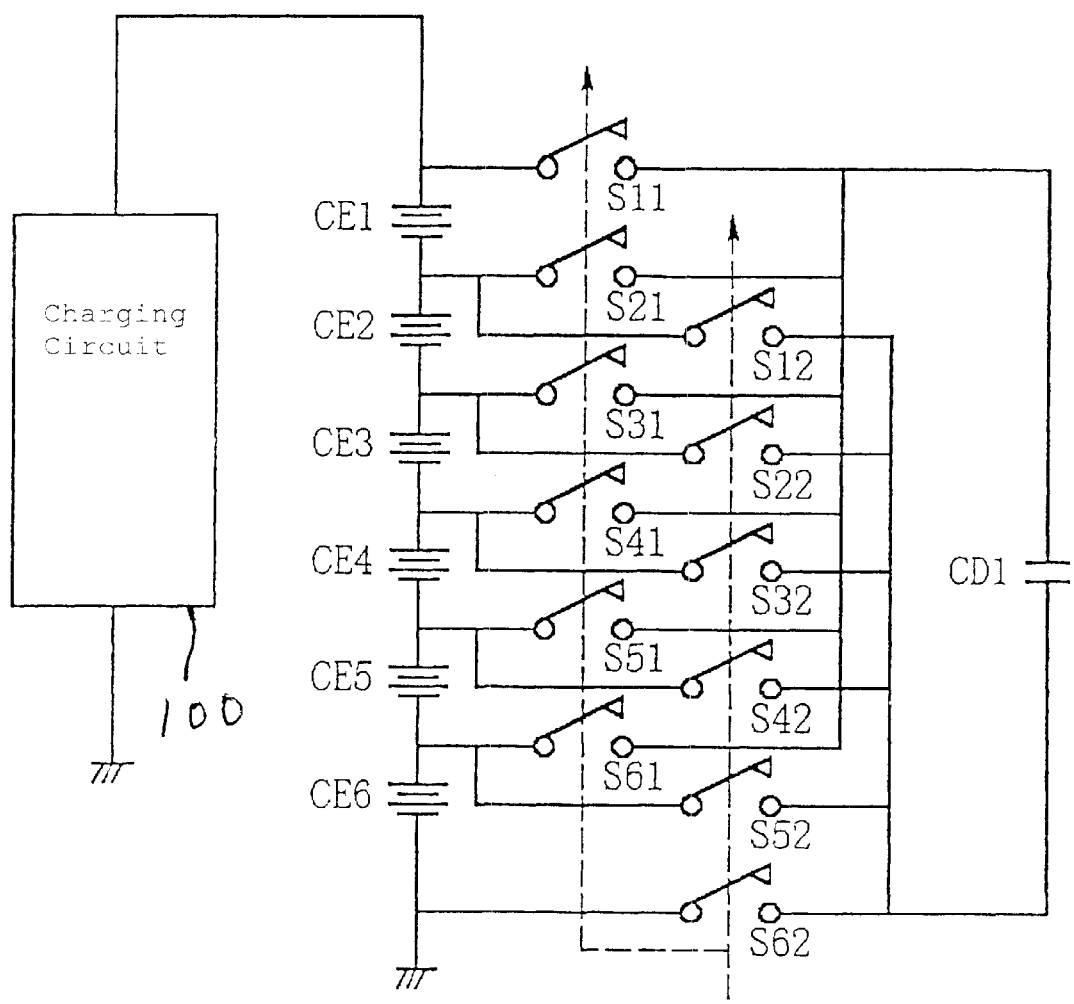
FIG. 3 is a circuit diagram illustrative of a first novel circuit configuration in a first embodiment according to the present invention.

A first embodiment according to the present invention will be described in detail with reference to the drawings. FIG. 3 is a circuit diagram illustrative of a first novel circuit configuration in a first embodiment according to the present invention. A series connection of first to sixth battery cells CE1, CE2, CE3, CE4, CE5 and CE6 is connected between a charging circuit 100 and a ground line. The charging circuit 100 may be replaced with a load circuit. Terminals of each of the first to sixth battery cells CE1, CE2, CE3, CE4, CE5 and CE6 are connected through a switching circuit to a capacitor CD1 as a voltage holder. The switching circuit further comprises first to twelfth switches S11, S21, S31, S41, S51, S61, S12, S22, S32, S42, S52, and S62.

A first side of the first battery cell CE1 is connected to the charging circuit 100. The first side of the first battery cell CE1 is further connected through the first switch S11 to a first side of the capacitor CD1 as the voltage holder. A second side of the first battery cell CE1 is connected to a first side of the second battery cell CE2. The second side of the first battery cell CE1 and the first side of the second battery cell CE2 are further connected through the second switch S21 to the first side of the capacitor CD1 as the voltage holder. The second side of the first battery cell CE1 and the first side of the second battery cell CE2 are also connected through the seventh switch S12 to the first side of the capacitor CD1 as the voltage holder. A second side of the second battery cell CE2 is connected to a first side of the third battery cell CE3. The second side of the second battery cell CE2 and the first side of the third battery cell CE3 are further connected through the third switch S31 to the first side of the capacitor CD1 as the voltage holder. The second side of the second battery cell CE2 and the first side of the third battery cell CE3 are further connected through the seventh switch S22 to the second side of the capacitor CD1 as the voltage holder. A second side of the third battery cell CE3 is connected to a first side of the fourth battery cell CE4. The second side of the third battery cell CE3 and the first side of the fourth battery cell CE4 are further connected through the fourth switch S41 to the first side of the capacitor CD1 as the voltage holder. The second side of the third battery cell CE3 and the first side of the fourth battery cell CE4 are further connected through the ninth switch S32 to the second side of the capacitor CD1 as the voltage holder. A second side of the fourth battery cell CE4 is connected to a first side of the fifth battery cell CE5. The second side of the fourth battery cell CE4 and the first side of the fifth battery cell CE5 are further connected through the fifth switch S51 to the first side of the capacitor CD1 as the voltage holder. The second side of the fourth battery cell CE4 and the first side of the fifth battery cell CE5 are further connected through the tenth switch S42 to the second side of the capacitor CD1 as the voltage holder. A second side of the fifth battery cell CE5 is connected to a first side of the sixth battery cell CE6. The second side of the fifth battery cell CE5 and the first side of the sixth battery cell CE6 are further connected through the sixth switch S61 to the first side of the capacitor CD1 as the voltage holder. The second side of the fifth battery cell CE5 and the first side of the sixth battery cell CE6 are also connected through the eleventh switch S52 to the second side of the capacitor CD1 as the voltage holder. A second side of the sixth battery cell CE6 is also connected through the twelfth switch S62 to the second side of the capacitor CD1 as the voltage holder.

Figure 4:
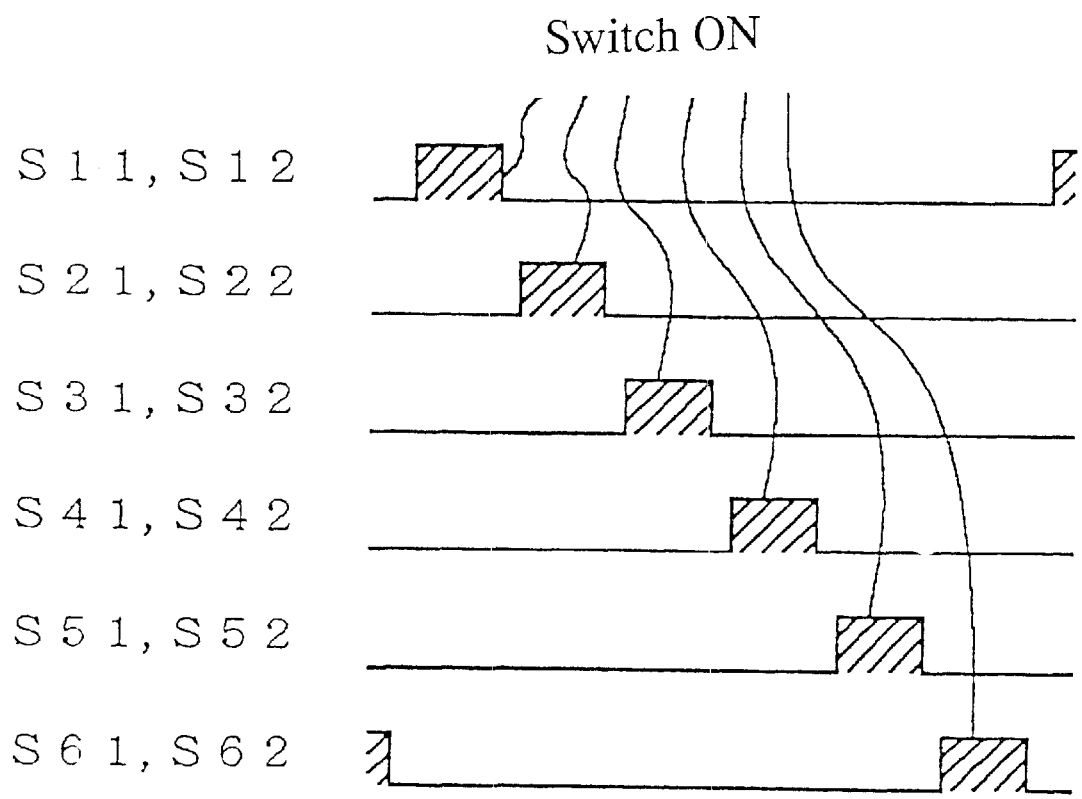
FIG. 4 is a time chart illustrative of switching operations of the switching circuit in the circuit of FIG. 3.

FIG. 4 is a time chart illustrative of switching operations of the switching circuit in the circuit of FIG. 3. Switching signals represented by broken lines with arrow marks are supplied to the first and seventh switches S11 and S12 so that the first and seventh switches S11 and S12 show concurrent switching operations. The first and seventh switches S11 and S12 turn ON before the first and seventh switches S11 and S12 turn OFF. Switching signals represented by broken lines with arrow marks are further supplied to the second and eighth switches S21 and S22 so that the second and eighth switches S12 and S22 show concurrent switching operations. After the first and seventh switches 11 and S12 turn OFF, then subsequently, the second and eighth switches S21 and S22 turn ON before the second and eighth switches S21 and S22 turn OFF. Switching signals represented by broken lines with arrow marks are further supplied to the third and ninth switches S31 and S32 so that the third and ninth switches S31 and S32 show concurrent switching operations. After the second and eighth switches S12 and S22 turn OFF, then subsequently, the third and ninth switches S31 and S32 turn ON before the third and ninth switches S31 and S32 turn OFF. Switching signals represented by broken lines with arrow marks are further supplied to the fourth and tenth switches S41 and S42 so that the fourth and tenth switches S41 and S42 show concurrent switching operations. After the third and ninth switches S31 and S32 turn OFF, then subsequently, the fourth and tenth switches S41 and S42 turn ON before the fourth and tenth switches S41 and S42 turn OFF. Switching signals represented by broken lines with arrow marks are further supplied to the fifth and eleventh switches S51 and S52 so that the fifth and eleventh switches S51 and S52 show concurrent switching operations. After the fourth and tenth switches S41 and S42 turn OFF, then subsequently, the fifth and eleventh switches S51 and S52 turn ON before the fifth and eleventh switches 551 and S52 turn OFF. Switching signals represented by broken lines with arrow marks are further supplied to the sixth and twelfth switches S61 and S62 so that the sixth and twelfth switches S61 and S62 show concurrent switching operations. After the fifth and eleventh switches S51 and S52 turn OFF, then subsequently, the sixth and twelfth switches S61 and S62 turn ON before the sixth and twelfth switches S61 and S62 turn OFF. The switch ON and subsequent switch OFF operations are sequentially made in the order of the first pair of first and seventh switches S11 and S12, the second pair of the second and eighth switches S12 and S22, the third pair of the third and ninth switches S31 and S32, the fourth pair of the fourth and tenth switches S41 and S42, the fifth pair of the fifth and eleventh switches S51 and S52, and the sixth pair of the sixth and twelfth switches S61 and S62.

Figure 5:
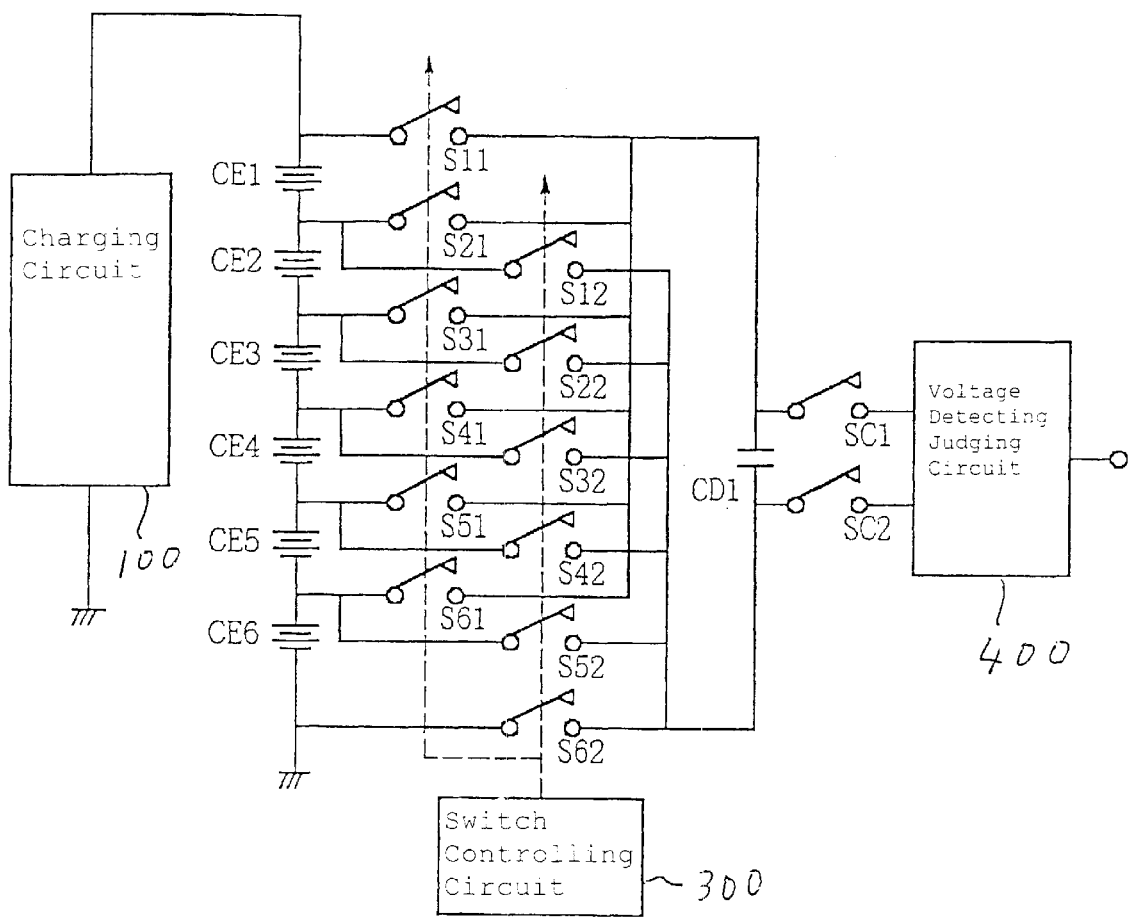
FIG. 5 is a circuit diagram illustrative of a novel voltage detecting circuit having a cell balance adjusting circuit of FIG. 3 in a first preferred embodiment in accordance with the present invention.

FIG. 5 is a circuit diagram illustrative of a novel voltage detecting circuit having a cell balance adjusting circuit of FIG. 3 in a first preferred embodiment in accordance with the present invention. The novel voltage detecting circuit has a switch controlling circuit 300 connected to the switching circuit of the cell balance adjusting circuit. The novel voltage detecting circuit further has a cell voltage detecting judging circuit 400 which is connected through a thirteenth switch SC1 to the first side of the capacitor CD1 as the voltage holder and also connected through a fourteenth switch SC2 to the second side of the capacitor CD1 as the voltage holder. The thirteenth and fourteenth switches SC1 and SC2 are higher in withstand voltage than the first to twelfth switches S11, S21, S31, S41, S51, S61, S12, S22, S32, S42, S52, and S62.

Figure 6:
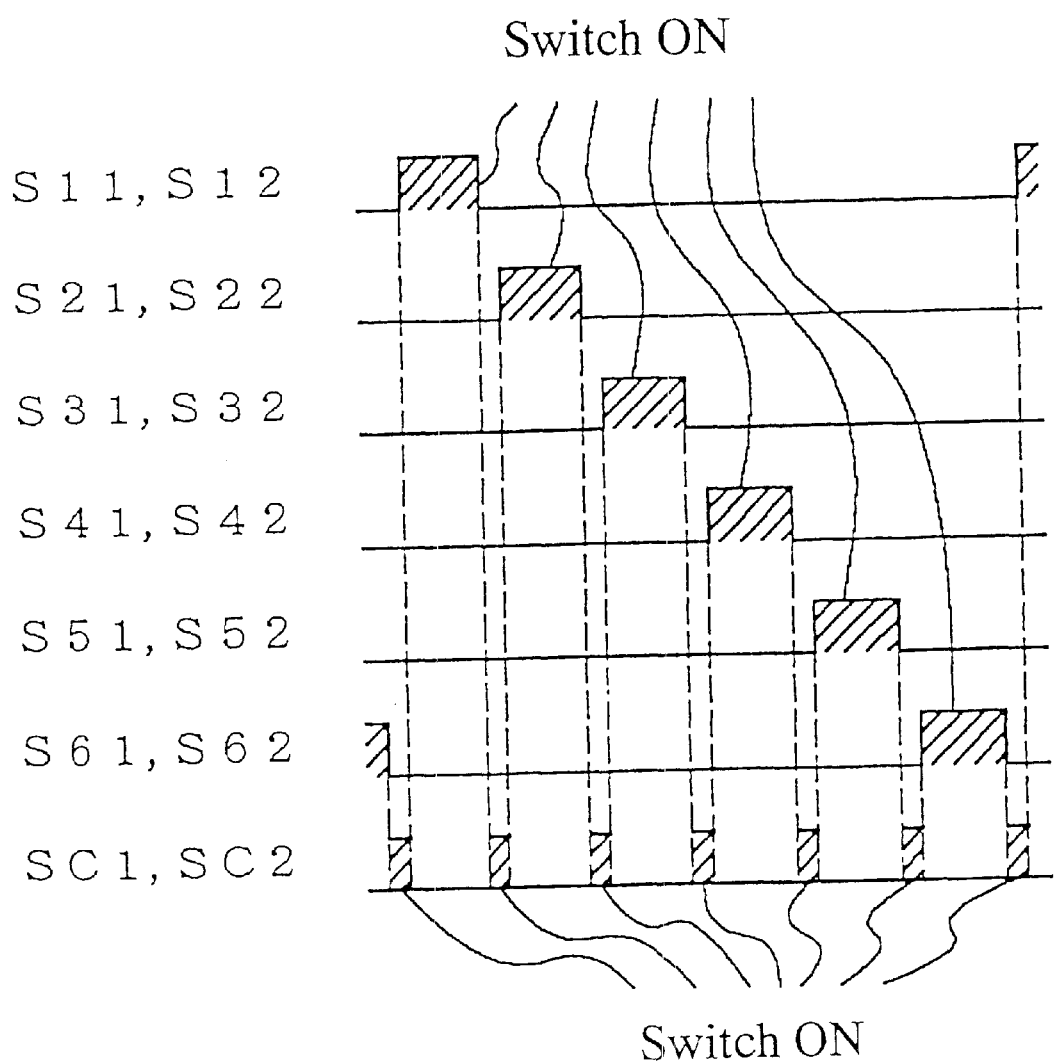
FIG. 6 is a time chart illustrative of switching operations of the switching circuit in the circuit of FIG. 5.

FIG. 6 is a time chart illustrative of switching operations of the switching circuit in the circuit of FIG. 5. The switching circuit shows a switching operation to provide a parallel connection between an intermediate point between adjacent two of the first to sixth basic cells CE1, CE2, CE3, CE4, CE5 and CE6 and the capacitor CD1 as the voltage holder. The switching circuit shows a unidirectional sequential scanning of the switching operation to all of the basic cells, as shown in FIG. 4, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the basic cells first to sixth basic cells CE1, CE2, CE3, CE4, CE5 and CE6. As a result, the cell balance adjustment is realized. FIG. 2 is a diagram illustrative of the individual cell voltage levels through the cyclic processes of the unidirectional sequential scanning of the switching operation in accordance with the present invention. ♦ represents the individual cell voltage levels before the unidirectional sequential scanning of the switching operation is made. ▼ represents the individual cell voltage levels after one cycle of the unidirectional sequential scanning of the switching operation has been made. ■ represents the individual cell voltage levels after five cycles of the unidirectional sequential scanning of the switching operation has been made. ○ represents the individual cell voltage levels after ten cycles of the unidirectional sequential scanning of the switching operation has been made. Δ represents the individual cell voltage levels after twenty cycles of the unidirectional sequential scanning of the switching operation has been made. ▢ represents the individual cell voltage levels after thirty cycles of the unidirectional sequential scanning of the switching operation has been made. As the number of the cycle of the unidirectional sequential scanning of the switching operation is increased, then the individual voltages of the intermediate point between adjacent two of the basic cells and the voltage holder are converged into a voltage of 0.92V. Further, the control circuit for controlling the switching circuit may comprise a simple sequential circuit such as a shift register. This allows the manufacturing cost of the circuit to below.

The switching circuit shows a switching operation to provide a parallel connection between an intermediate point between adjacent two of the first to sixth basic cells CE1, CE2, CE3, CE4, CE5 and CE6 and the capacitor CD1 as the voltage holder. The switching circuit shows a unidirectional sequential scanning of the switching operation to all of the basic cells, as shown in FIG. 4, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the first to sixth basic cells CE1, CE2, CE3, CE4, CE5 and CE6. As a result, the cell balance adjustment is realized. As shown in FIG. 2, as the number of the cycle of the unidirectional sequential scanning of the switching operation is increased, then the individual voltages of the intermediate point between adjacent two of the basic cells and the voltage holder are converged into a voltage of 0.92V. Further, the control circuit for controlling the switching circuit may comprise a simple sequential circuit such as a shift register. This allows the manufacturing cost of the circuit to below.

Further, the voltage detecting judging circuit 400 has the thirteenth and fourteenth switches SC1 and SC2 connected to the first and second sides of the capacitor CD1 as the voltage holder, where the thirteenth and fourteenth switches SC1 and SC2 connect the capacitor CD1 as the voltage holder and the voltage detecting judging circuit 400 to enable the voltage detecting judging circuit 400 to detect a voltage of the capacitor CD1 as the voltage holder after one parallel connection between the first to sixth basic cells CE1, CE2, CE3, CE4, CE5 and CE6 and the capacitor CD1 as the voltage holder has been disconnected and before other parallel connection between the first to sixth basic cells CE1, CE2, CE3, CE4, CE5 and CE6 and the capacitor CD1 as the voltage holder is made. This means that the voltage detecting judging circuit 400 having the lower withstand voltage is usable for detecting the voltages which are proportional to the individual voltages of the first to sixth basic cells CE1, CE2, CE3, CE4, CE5 and CE6 without detecting the total high voltage level of the series connected first to sixth basic cells CE1, CE2, CE3, CE4, CE5 and CE6. The voltage detecting judging circuit 400 is not required to have the high withstand voltage. This allows the voltage detecting judging circuit 400 to be inexpensive.

If the balance in voltage is kept among the first to sixth basic cells CE1, CE2, CE3, CE4, CE5 and CE6, and if the individual voltages of the first to sixth basic cells CE1, CE2, CE3, CE4, CE5 and CE6 are the same, then no charge transfer is made by the above sequential switching operations between each of the first to sixth basic cells CE1, CE2, CE3, CE4, CE5 and CE6 and the capacitor CD1 as the voltage holder. Namely, the above sequential switching operations cause no change in voltage balance. If, however, the first to sixth basic cells CE1, CE2, CE3, CE4, CE5 and CE6 are unbalanced in voltage, and if the individual voltages of the first to sixth basic cells CE1, CE2, CE3, CE4, CE5 and CE6 are different from each other, then charge transfers are made by the above sequential switching operations between each of the first to sixth basic cells CE1, CE2, CE3, CE4, CE5 and CE6 and the capacitor CD1 as the voltage holder. Namely, the above sequential switching operations cause the following change in voltage balance.

The subsequent descriptions will be made by assuming the following conditions. Any of the first to sixth basic cells CE1, CE2, CE3, CE4, CE5 and CE6 has a different voltage from the remaining five. The capacitor CD1 as the voltage holder has a half capacity than each of the first to sixth basic cells CE1, CE2, CE3, CE4, CE5 and CE6. The first, third, fourth, fifth and sixth basic cells CE1, CE3, CE4, CE5 and CE6 have 1V and the capacitor CD1 as the voltage holder also has 1V. An energy processed by each of the first to sixth basic cells CE1, CE2, CE3, CE4, CE5 and CE6 is approximated to be proportional to the cell voltage, even actually the energy processed by the basic cell is not proportional to the cell voltage. The above approximation is no problem because the internal energy of the cell and the cell voltage have a positive inter-relationship.

The second basic cell CE2 has a voltage of 0.5 which is a half of the voltage of 1V of the remaining basic cells CE1, CE3, CE4, CE5 and CE6. The second basic cell CE2 is made connected to the capacitor CD1 as the voltage holder having the same voltage of the first basic cell CE1. A voltage between the first and second terminals of the second basic cell CE2 is calculated from the capacitive ratio thereof. An amount "Q" of the accumulated charges in the capacitor is given by "Q=C×V". The voltage across the first and second terminal of the second basic cell CE2 after the second basic cell CE2 was connected to the capacitor CD1 as the voltage holder is given by the following equation.

$$V = (Vce2 = Cce2 + Vcd2 = Ccd1)/(Cce2 \times Ccd1),$$

where V is the voltage across the first and second terminal of the second basic cell CE2 after the second basic cell CE2 was connected to the capacitor CD1 as the voltage holder, Vce2 is the voltage of the second basic cell CE2, Cce2 is the capacitance of the second basic cell CE2, Vcd1 is the voltage of the capacitor CD1 as the voltage holder, and Ccd1 is the capacitance of the capacitor CD1 as the voltage holder. As the second basic cell CE2 is made connected to the capacitor CD1 as the voltage holder, then the voltage across the first and second terminal of the second basic cell CE2 is changed from 0.5V to 0.667V, and further the voltage of the capacitor CD1 as the voltage holder is changed from 1V to 0.667V. Subsequently, the second basic cell CE2 is made disconnected from the capacitor CD1 as the voltage holder. The third basic cell CE3 having the voltage of 1V is then made connected to the capacitor CD1 as the voltage holder having the voltage of 0.667V, whereby the voltage across the first and second terminal of the third basic cell CE3 is changed from 1V to 0.889V, and further the voltage of the capacitor CD1 as the voltage holder is changed from 0.667V to 0.889V. Subsequently, the third basic cell CE3 is made disconnected from the capacitor CD1 as the voltage holder. The fourth basic cell CE4 having the voltage of 1V is then made connected to the capacitor CD1 as the voltage holder having the voltage of 0.889V, whereby the voltage across the first and second terminal of the fourth basic cell CE4 is changed from 1V to 0.963V, and further the voltage of the capacitor CD1 as the voltage holder is changed from 0.889V to 0.963V. Subsequently, the fourth basic cell CE4 is made disconnected from the capacitor CD1 as the voltage holder. The fifth basic cell CE5 having the voltage of 1V is then made connected to the capacitor CD1 as the voltage holder having the voltage of 0.963V, whereby the voltage across the first and second terminal of the fifth basic cell CE5 is changed from 1V to 0.988V, and further the voltage of the capacitor CD1 as the voltage holder is changed from 0.963V to 0.988V. Subsequently, the fifth basic cell CE5 is made disconnected from the capacitor CD1 as the voltage holder. The sixth basic cell CE6 having the voltage of 1V is then made connected to the capacitor CD1 as the voltage holder having the voltage of 0.988V, whereby the voltage across the first and second terminal of the fifth basic cell CE5 is changed from 1V to 0.996V, and further the voltage of the capacitor CD1 as the voltage holder is changed from 0.988V to 0.996V Subsequently, the sixth basic cell CE6 is made disconnected from the capacitor CD1 as the voltage holder.

In FIG. 2, ♦ represents the individual cell voltage levels before the unidirectional sequential scanning of the switching operation is made. ▼ represents the individual cell voltage levels after one cycle of the unidirectional sequential scanning of the switching operation has been made. ■ represents the individual cell voltage levels after five cycles of the unidirectional sequential scanning of the switching operation has been made. ○ represents the individual cell voltage levels after ten cycles of the unidirectional sequential scanning of the switching operation has been made. Δ represents the individual cell voltage levels after twenty cycles of the unidirectional sequential scanning of the switching operation has been made. ☐ represents the individual cell voltage levels after thirty cycles of the unidirectional sequential scanning of the switching operation has been made. As the number of the cycle of the unidirectional sequential scanning of the switching operation is increased, then the individual voltages of the intermediate point between adjacent two of the basic cells and the voltage holder are converged into a voltage of 0.92V. Namely after the tenth cycle of the unidirectional sequential scanning of the switching operation has been completed, then the difference in voltage of the basic cells is reduced to 26 mV. After the fifteenth cycle of the unidirectional sequential scanning of the switching operation has been completed, then the difference in voltage of the basic cells is reduced to ±1 mV. About ten cycles of the unidirectional sequential scanning of the switching operation reduces the difference in voltage of the basic cells into 1/20. The increase in the number of the cycles of the unidirectional sequential scanning of the switching operation obtains the balance in voltage of the basic cells. The balance can be obtained in a sufficiently shorter time than a voltage variation caused by a self-discharge of the basic cell which causes the unbalance in voltage of the cells. This means that the above circuit is responsible as the balance adjusting circuit.

The above adjusting operation is the simple operation to sequentially connect each of the series-connected basic cells to the capacitor CD1 as the voltage holder. Thus, the above circuit is applicable not only in the charge process by use of the charging circuit but also in the discharge process by use of the load circuit and further applicable to when the series connection of the basic cells is in the open state, wherein no load is connected to opposite ends of the series connection of the basic cells.

As the difference in voltage among the cells is reduced, a current flowing through the switching circuit is also reduced, for which reason after the adjustment has been completed, the continuing operation causes almost no power consumption.

The voltage possessed by the capacitor as the voltage holder is the voltage of the individual basic cells. If the basic cells comprise nickel-hydrogen cells, then the voltage is about 1.2V. If the basic cells comprise lithium cells, then the voltage is about 3.6V. Namely, the voltage holder is applied with the individual voltage of the basic cells but no applied with the total voltage of the series-connected basic cells. This means that the voltage holder may have a low withstand voltage.

The voltage detecting judging circuit 400 are connected through the thirteenth and fourteenth switches SC1 and SC2 to the capacitor CD1 as the voltage holder, where the thirteenth and fourteenth switches SC1 and SC2 connect the capacitor CD1 as the voltage holder and the voltage detecting judging circuit 400 to enable the voltage detecting judging circuit 400 to detect a voltage of the capacitor CD1 as the voltage holder having the same voltage level as the basic cell previously connected thereto, after one parallel connection between the basic cells and the voltage holder has been disconnected and before other parallel connection between the basic cells and the voltage holder is made. The voltage detecting judging circuit 400 may have a low withstand voltage.

If a few of the basic cells are series-connected, a voltage across the opposite ends of the series connection is in the range of a few voltage to several tends voltages. Namely, the withstand voltage of about 20V of the semiconductor integrated circuit is sufficient.

If the switch may comprise a relay switch, a driving voltage of the relay defines the withstand voltage of the switching circuit. A lower withstand voltage, for example, 5V is sufficiently responsible, and the voltage detecting judging circuit 400 may have a low withstand voltage of 5V.

As a modification, it is possible that the voltage holder may comprise a cell having the same structure as the basic cells, or other capacitor such as an air double-layered capacitor.

As a further modification, it is possible that the switch may comprise a semiconductor switching device or a mechanical switch.

As described above, the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning to realize the perfect adjustment to the cell balance without using any highly accurate voltage detecting judging circuit and any complicated algorithm for selecting the switches. The variations in voltage of the basic cells are reduced so that the individual voltage levels of the basic cells are converged into an intermediate voltage level. The voltage detecting judging circuit may have a lower withstand voltage in the same level as each of the basic cells.

If the balance in voltage is kept among the basic cells, then the cell voltage is the same as the voltage holder, for which reason no current flows through the switching circuit. This means that a power consumption is extremely low. This adjustment operation is applicable not only in the charge process by use of the charging circuit but also in the discharge process by use of the load circuit and further applicable to when the series connection of the basic cells is in the open state, wherein no load is connected to opposite ends of the series connection of the basic cells.

Second Embodiment

Figure 7:
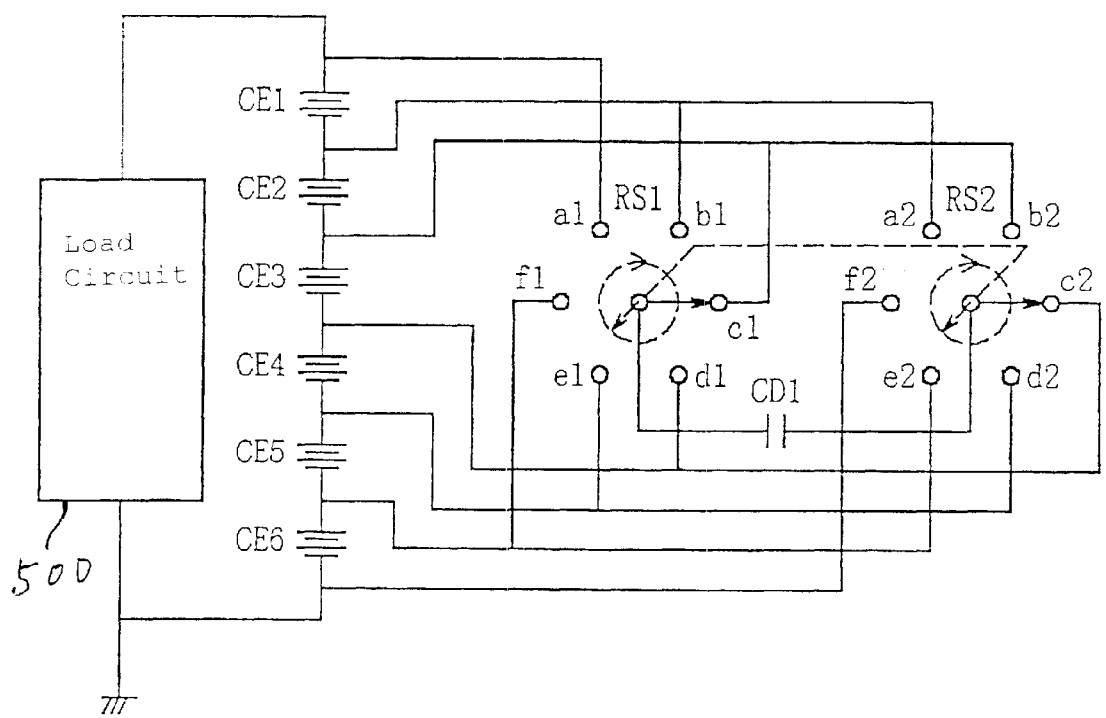
FIG. 7 is a circuit diagram illustrative of a second novel circuit configuration in a second embodiment according to the present invention.

A second embodiment of the present invention will be described. FIG. 7 is a circuit diagram illustrative of a second novel circuit configuration in a second embodiment according to the present invention. A series connection of first to sixth battery cells CE1, CE2, CE3, CE4, CE5 and CE6 is connected between a load circuit 500 and a ground line. Terminals of each of the first to sixth battery cells CE1, CE2, CE3, CE4, CE5 and CE6 are connected through a switching circuit to a capacitor CD1 as a voltage holder. The switching circuit further comprises a first rotary switch RS1 and a second rotary switch RS2. The first rotary switch RS1 has a common contact, and a first contact a1, a second contact b1, a third contact c1, a fourth contact d1, a fifth contact e1 and a sixth contact f1. The second rotary switch RS2 has a common contact, and a first contact a2, a second contact b2, a third contact c2, a fourth contact d2, a fifth contact e2 and a sixth contact f2. The common contact of the first rotary switch RS1 is connected to a first side of the capacitor CD1 as the voltage holder. The common contact of the second rotary switch RS2 is connected to a second side of the capacitor CD1 as the voltage holder.

A first side of the first battery cell CE1 is connected to the load circuit 500. The first side of the first battery cell CE1 is further connected to the first contact a1 of the first rotary switch RS1. A second side of the first battery cell CE1 is connected to a first side of the second battery cell CE2. The second side of the first battery cell CE1 and the first side of the second battery cell CE2 are further connected to the first contact a2 of the second rotary switch RS2. The second side of the first battery cell CE1 and the first side of the second battery cell CE2 are further connected to the second contact b1 of the first rotary switch RS1. A second side of the second battery cell CE2 is connected to a first side of the third battery cell CE3. The second side of the second battery cell CE2 and the first side of the third battery cell CE3 are further connected to the second contact b2 of the second rotary switch RS2. The second side of the second battery cell CE2 and the first side of the third battery cell CE3 are further connected to the third contact c1 of the first rotary switch RS1. A second side of the third battery cell CE3 is connected to a first side of the fourth battery cell CE4. The second side of the third battery cell CE3 and the first side of the fourth battery cell CE4 are further connected to the third contact c2 of the second rotary switch RS2. The second side of the third battery cell CE3 and the first side of the fourth battery cell CE4 are further connected to the fourth contact d1 of the first rotary switch RS1. A second side of the fourth battery cell CE4 is connected to a first side of the fifth battery cell CE5. The second side of the fourth battery cell CE4 and the first side of the fifth battery cell CE5 are further connected to the fourth contact d2 of the second rotary switch RS2. The second side of the fourth battery cell CE4 and the first side of the fifth battery cell CE5 are further connected to the fifth contact e1 of the first rotary switch RS1. A second side of the fifth battery cell CE5 is connected to a first side of the sixth battery cell CE6. The second side of the fifth battery cell CE5 and the first side of the sixth battery cell CE6 are further connected to the fifth contact e2 of the second rotary switch RS2. The second side of the fifth battery cell CE5 and the first side of the sixth battery cell CE6 are also connected to the sixth contact f1 of the first rotary switch RS1. A second side of the sixth battery cell CE6 is also connected to the sixth contact f2 of the second rotary switch RS2.

The above first and second rotary switches co-operate with the mechanical rotation of the load of the electric car or electric scooter. As the electric car or electric scooter begins to travel, then the above first and second rotary switches rotate, whereby the contact points are changed, whereby automatically the adjustment to the cell balance is made. The contacts of the first and second rotary switches may be provided to any rotating part of the electric car or electric scooter, for example, wheel or motor. The necessary structure for realizing the cell balance adjustment is simple. If the above circuit is applied to an electric assisting bicycle, then the contacts of the rotary switches are provided to the wheel.

As a modification, it is possible that the voltage holder may comprise a cell having the same structure as the basic cells, or other capacitor such as an air double-layered capacitor.

As described above, the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning to realize the perfect adjustment to the cell balance without using any highly accurate voltage detecting judging circuit and any complicated algorithm for selecting the switches. The variations in voltage of the basic cells are reduced so that the individual voltage levels of the basic cells are converged into an intermediate voltage level. The voltage detecting judging circuit may have a lower withstand voltage in the same level as each of the basic cells.

If the balance in voltage is kept among the basic cells, then the cell voltage is the same as the voltage holder, for which reason no current flows through the switching circuit. This means that a power consumption is extremely low. This adjustment operation is applicable not only in the charge process by use of the charging circuit but also in the discharge process by use of the load circuit and further applicable to when the series connection of the basic cells is in the open state, wherein no load is connected to opposite ends of the series connection of the basic cells.

Third Embodiment

Figure 8:
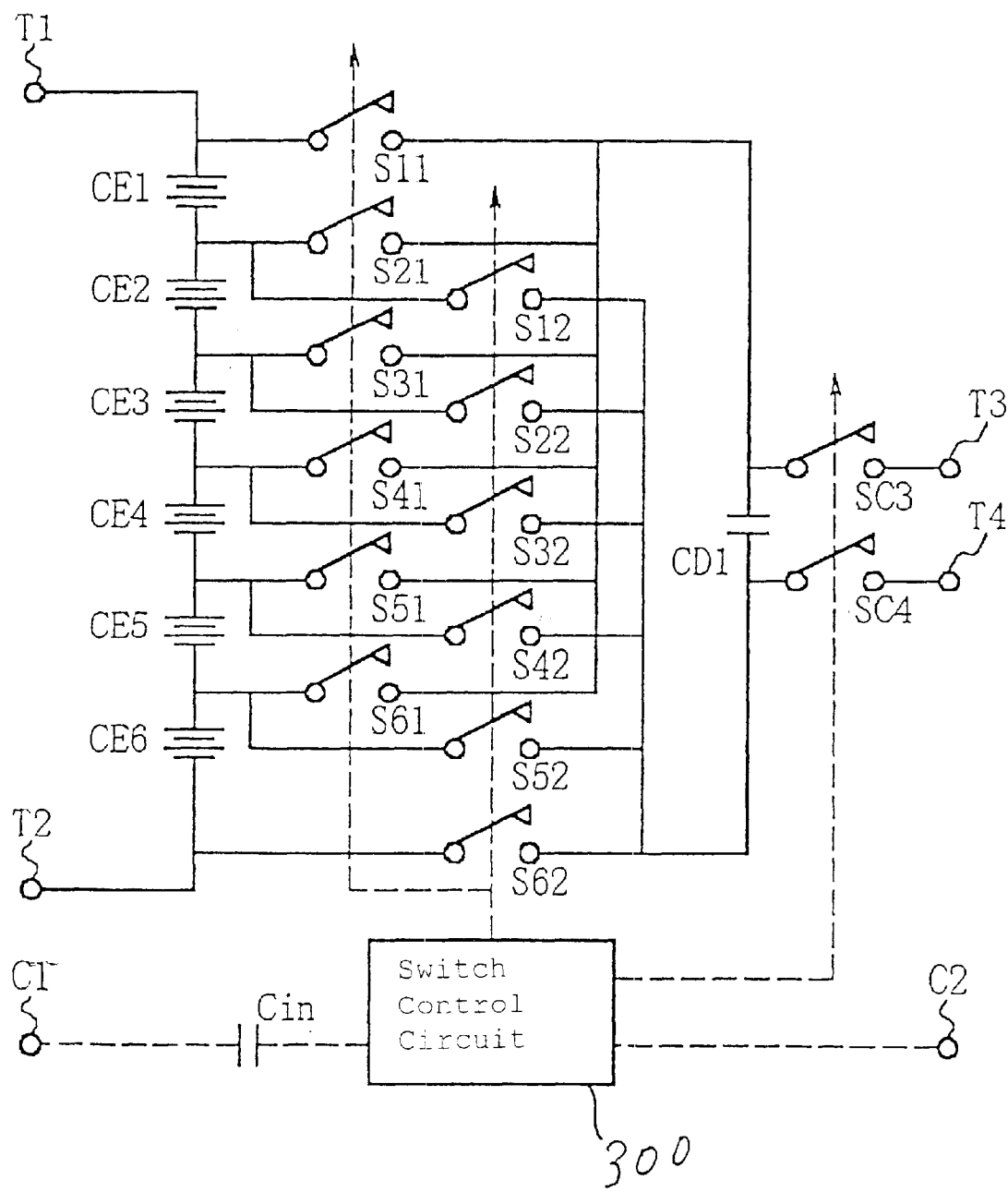
FIG. 8 is a circuit diagram illustrative of a novel circuit configuration of one of plural modules in a third embodiment according to the present invention.
Figure 9:
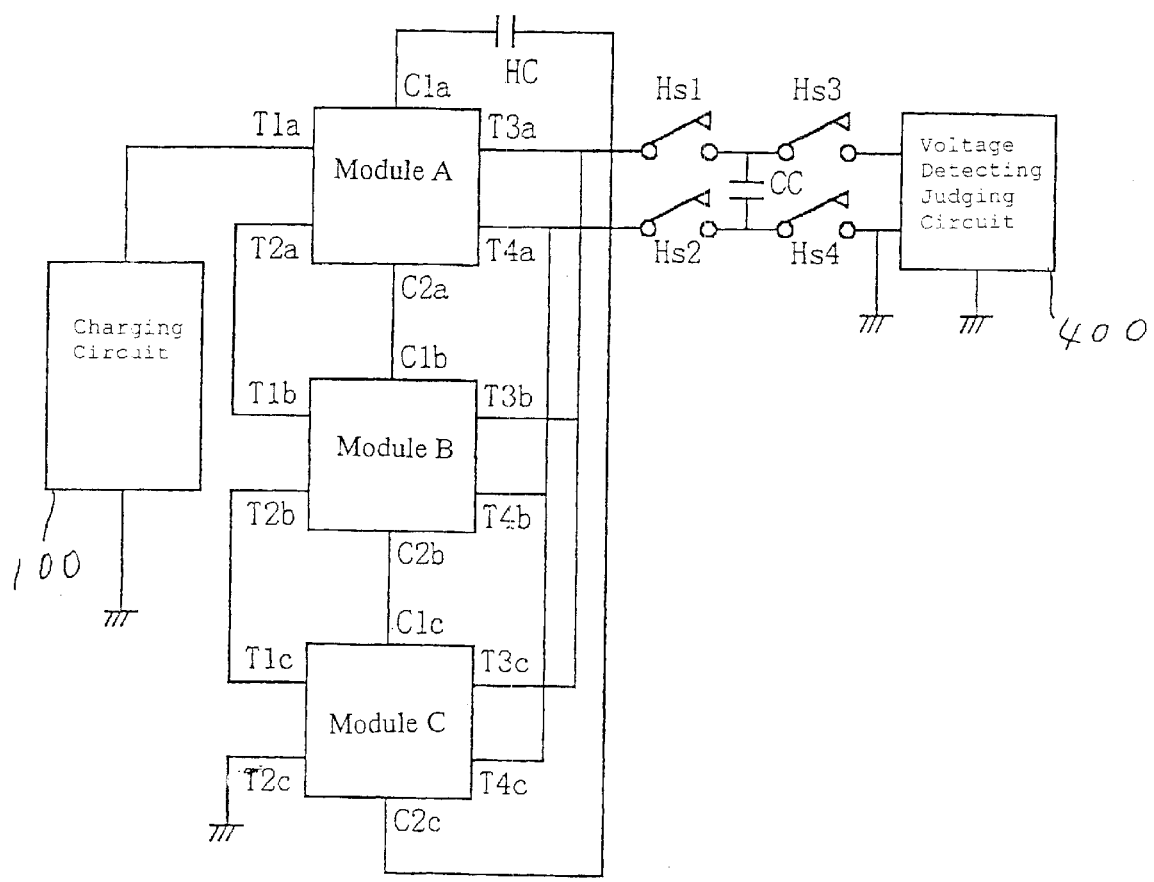
FIG. 9 is a circuit diagram illustrative of a novel circuit configuration of call balance adjusting circuit incorporating plural modules shown in FIG. 8.

A third embodiment of the present invention will be described. FIG. 8 is a circuit diagram illustrative of a novel circuit configuration of one of plural modules in a third embodiment according to the present invention. FIG. 9 is a circuit diagram illustrative of a novel circuit configuration of call balance adjusting circuit incorporating plural modules shown in FIG. 8. Each of the modules has the following circuit configuration. A series connection of first to sixth battery cells CE1, CE2, CE3, CE4, CE5 and CE6 is connected between a first terminal T1 and a second terminal T2. Terminals of each of the first to sixth battery cells CE1, CE2, CE3, CE4, CE5 and CE6 are connected through a switching circuit to a capacitor CD1 as a voltage holder. A first side of the capacitor CD1 as the voltage holder is connected through a thirteenth switch SC3 to a third terminal T3. A second side of the capacitor CD1 as the voltage holder is connected through a fourteenth switch SC4 to a fourth terminal T4. A switch control circuit 300 is connected to the switching circuit for supplying switching control signals thereto. The switching control circuit 300 is connected through a capacitor Cin to an input terminal C1, wherein the capacitor Cin cuts a direct application of the voltage to the control circuit 300. The capacitor Cin is the optical element. The switching control circuit 300 is connected to an output terminal C2, from which a request signal is sent to the outside of the module. The switching circuit further comprises first to twelfth switches S11, S21, S31, S41, S51, S61, S12, S22, S32, S42, S52, and S62.

A first side of the first battery cell CE1 is connected to the charging circuit 100. The first side of the first battery cell CE1 is further connected through the first switch S11 to a first side of the capacitor CD1 as the voltage holder. A second side of the first battery cell CE1 is connected to a first side of the second battery cell CE2. The second side of the first battery cell CE1 and the first side of the second battery cell CE2 are further connected through the second switch S21 to the first side of the capacitor CD1 as the voltage holder. The second side of the first battery cell CE1 and the first side of the second battery cell CE2 are also connected through the seventh switch S12 to the first side of the capacitor CD1 as the voltage holder. A second side of the second battery cell CE2 is connected to a first side of the third battery cell CE3. The second side of the second battery cell CE2 and the first side of the third battery cell CE3 are further connected through the third switch S31 to the first side of the capacitor CD1 as the voltage holder. The second side of the second battery cell CE2 and the first side of the third battery cell CE3 are further connected through the seventh switch S22 to the second side of the capacitor CD1 as the voltage holder. A second side of the third battery cell CE3 is connected to a first side of the fourth battery cell CE4. The second side of the third battery cell CE3 and the first side of the fourth battery cell CE4 are further connected through the fourth switch S41 to the first side of the capacitor CD1 as the voltage holder. The second side of the third battery cell CE3 and the first side of the fourth battery cell CE4 are further connected through the ninth switch S32 to the second side of the capacitor CD1 as the voltage holder. A second side of the fourth battery cell CE4 is connected to a first side of the fifth battery cell CE5. The second side of the fourth battery cell CE4 and the first side of the fifth battery cell CE5 are further connected through the fifth switch S51 to the first side of the capacitor CD1 as the voltage holder. The second side of the fourth battery cell CE4 and the first side of the fifth battery cell CE5 are further connected through the tenth switch S42 to the second side of the capacitor CD1 as the voltage holder. A second side of the fifth battery cell CE5 is connected to a first side of the sixth battery cell CE6. The second side of the fifth battery cell CE5 and the first side of the sixth battery cell CE6 are further connected through the sixth switch S61 to the first side of the capacitor CD1 as the voltage holder. The second side of the fifth battery cell CE5 and the first side of the sixth battery cell CE6 are also connected through the eleventh switch S52 to the second side of the capacitor CD1 as the voltage holder. A second side of the sixth battery cell CE6 is also connected through the twelfth switch S62 to the second side of the capacitor CD1 as the voltage holder.

Switching signals represented by broken lines with arrow marks are supplied to the first and seventh switches S11 and S12 so that the first and seventh switches S11 and S12 show concurrent switching operations. The first and seventh switches S11 and S12 turn ON before the first and seventh switches S11 and S12 turn OFF. Switching signals represented by broken lines with arrow marks are further supplied to the second and eighth switches S21 and S22 so that the second and eighth switches S12 and S22 show concurrent switching operations. After the first and seventh switches S11 and S12 turn OFF, then subsequently, the second and eighth switches S21 and S22 turn ON before the second and eighth switches S21 and S22 turn OFF. Switching signals represented by broken lines with arrow marks are further supplied to the third and ninth switches S31 and S32 so that the third and ninth switches S31 and S32 show concurrent switching operations. After the second and eighth switches S12 and S22 turn OFF, then subsequently, the third and ninth switches S31 and S32 turn ON before the third and ninth switches S31 and S32 turn OFF. Switching signals represented by broken lines with arrow marks are further supplied to the fourth and tenth switches S41 and S42 so that the fourth and tenth switches S41 and S42 show concurrent switching operations. After the third and ninth switches S31 and S32 turn OFF, then subsequently, the fourth and tenth switches S41 and S42 turn ON before the fourth and tenth switches S41 and S42 turn OFF. Switching signals represented by broken lines with arrow marks are further supplied to the fifth and eleventh switches S51 and S52 so that the fifth and eleventh switches S51 and S52 show concurrent switching operations. After the fourth and tenth switches S41 and S42 turn OFF, then subsequently, the fifth and eleventh switches S51 and S52 turn ON before the fifth and eleventh switches S51 and S52 turn OFF. Switching signals represented by broken lines with arrow marks are further supplied to the sixth and twelfth switches S61 and S62 so that the sixth and twelfth switches S61 and S62 show concurrent switching operations. After the fifth and eleventh switches S51 and S52 turn OFF, then subsequently, the sixth and twelfth switches S61 and S62 turn ON before the sixth and twelfth switches S61 and S62 turn OFF. The switch ON and subsequent switch OFF operations are sequentially made in the order of the first pair of first and seventh switches S11 and S12, the second pair of the second and eighth switches S12 and S22, the third pair of the third and ninth switches S31 and S32, the fourth pair of the fourth and tenth switches S41 and S42, the fifth pair of the fifth and eleventh switches S51 and S52, and the sixth pair of the sixth and twelfth switches S61 and S62.

The switching circuit shows a switching operation to provide a parallel connection between an intermediate point between adjacent two of the first to sixth basic cells CE1, CE2, CE3, CE4, CE5 and CE6 and the capacitor CD1 as the voltage holder. The switching circuit shows a unidirectional sequential scanning of the switching operation to all of the basic cells, so as to reduce the averaged value of the voltage differences between the adjacent basic cells. Further, the unidirectional sequential scanning of the switching operation is further repeated to further reduce the averaged value of the voltage differences between the adjacent basic cells so as to obtain a uniform voltage of all of the basic cells first to sixth basic cells CE1, CE2, CE3, CE4, CE5 and CE6. As a result, the cell balance adjustment is realized.

The above module shown in FIG. 8 is incorporated into the circuit of FIG. 9. The circuit has a charging circuit 100, a first module "A", a second module "B", a third module "C", a voltage detecting judging circuit 400, and a switching device. The switching device comprises a fifteenth switch Hs1, a sixteenth switch Hs2, a seventeenth switch Hs3 and an eighteenth switch Hs4 a nd a capacitance CC. The fifieenth switch Hs1 and the seventeenth switch Hs3 are connected in series to the voltage detecting judging circuit 400. The sixteenth switch Hs0 and the eighteenth switch Hs4 are connected in series to the voltage detecting judging circuit 400. An intermediate point between fifteenth switch Hs1 and the seventeenth switch Hs3 is connected through the capacitor CC to an intermediate point between the sixteenth switch Hs2 and the eighteenth switch Hs4. The charging circuit 100 may be replaced by a load circuit. A first terminal T1$a$ of the first module "A" is connected to the charging circuit 100. A second terminal T2$a$ of the first module "A" is connected to a first terminal T1$b$ of the second module "B". A third terminal T3$a$ of the first module "A" is connected to the fifteenth switch Hs1. A fourth terminal T4$a$ of the first module "A" is connected to the sixteenth switch Hs2. The input terminal C1$a$ of the first module "A" is connected to a first side of a capacitor HC. The output terminal C2a of the first module "A" is connected to an input terminal C1a of the second module "B". A first terminal T1b of the second module "B" is connected to the second terminal T2a of the first module "A". A second terminal T2b of the second module "B" is connected to a first terminal T1c of the third module "C". A third terminal T3b of the second module "B" is connected to the fifteenth switch Hs1. A fourth terminal T4b of the second module "B" is connected to the sixteenth switch Hs2. The input terminal C1b of the second module "B" is connected to the output terminal C2a of the first module "A". The output terminal C2b of the second module "B" is connected to an input terminal C1c of the third module "C". A first terminal T1c of the third module "C" is connected to the second terminal T2b of the second module "B". A second terminal T2c of the third module "C" is connected to a ground line. A third terminal T3c of the third module "C" is connected to the fifteenth switch Hs1. A fourth terminal T4c of the third module "C" is connected to the sixteenth switch Hs2. The input terminal C1c of the third module "C" is connected to the output terminal C2b of the second module "B". The output terminal C2c of the third module "C" is connected to a second side of the capacitor HC. Since the first, second and third modules "A", "B" and "C" are connected in series to generate a high voltage, a battery package is capable of generating the high voltage. The above sequential switching operations in each of the modules makes the cell voltages uniform. In the adjacent two of the modules, the concurrent sequential switching operations are made to make the cell voltages uniform between the adjacent two of the modules. A voltage adjustment is made between the adjacent two of the modules, for which reason no large difference in voltage among the basic cells and thus the control circuit in each of the modules may have a low withstand voltage. The voltage adjustment between the adjacent two of the modules is sequentially made in the same manner as among the basic cells in each of the modules, to realize a perfect balance in voltage of the basic cells throughout the modules. It is possible to take a perfect cell voltage balance with use of the control circuits having the low withstand voltage independently from the high voltage generated by the battery package. The switches Hs1, Hs2, Hs3 and Hs4 are higher in withstand voltage than the switches included in each of the modules. This allows that the voltage detecting judging circuit to have a low withstand voltage.

The high voltage generated by such the battery package is suitable for the electric car, the hybrid car or the fuel car, for example, 240V. The circuit is not required to have such a high withstand voltage as 240V. Such a withstand voltage of the circuit as the individual basic cell voltage is sufficient. Even the withstand voltages of the switches Hs1, Hs2, Hs3 and Hs4 are so high as responsible to the high voltage generated by the battery package. However, the mechanical relay has such high withstand voltage as required. Since the mechanical relay is inexpensive, the circuit may also be inexpensive. It is possible that the switches Hs1, Hs2, Hs3 and Hs4 comprise semiconductor switching devices having such the high withstand voltage.

It is possible to vary the number of the modules.

As a modification, it is possible that the voltage holder may comprise a cell having the same structure as the basic cells, or other capacitor such as an air double-layered capacitor.

As a further modification, it is possible that the switch may comprise a semiconductor switching device or a mechanical switch.

As described above, the switching circuit shows a switching operation to provide a parallel connection between an intermediate point between adjacent two of the basic cells and the voltage holder, and the switching circuit shows a unidirectional sequential scanning of the switching operation to all of the basic cells, and the switching circuit repeats the unidirectional sequential scanning to realize the perfect adjustment to the cell balance without using any highly accurate voltage detecting judging circuit and any complicated algorithm for selecting the switches. The variations in voltage of the basic cells are reduced so that the individual voltage levels of the basic cells are converged into an intermediate voltage level. The voltage detecting judging circuit may have a lower withstand voltage in the same level as each of the basic cells.

If the balance in voltage is kept among the basic cells, then the cell voltage is the same as the voltage holder, for which reason no current flows through the switching circuit. This means that a power consumption is extremely low. This adjustment operation is applicable not only in the charge process by use of the charging circuit but also in the discharge process by use of the load circuit and further applicable to when the series connection of the basic cells is in the open state, wherein no load is connected to opposite ends of the series connection of the basic cells.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A cell balance adjusting circuit comprising:
   a series connection of basic cells;
   a switching circuit connected to all the terminals of the basic cells; and
   a voltage holder connected, via the switching circuit, to the series connection of basic cells,
   the switching circuit comprising a first set of switches and a second set of switches,
   the first set of switches connecting a first terminal of the voltage holder with a first side terminal of each basic cell, and
   the second set of switches connecting a second terminal of the voltage holder with a second side terminal of each basic cell,
   wherein the first and second set of switches are operable to place a current basic cell in a parallel connection with the voltage holder by repeatedly proceeding from a first cell of the series connection of basic cells to a final cell of the series connection of basic cells.

2. The cell balance adjusting circuit of claim 1, further comprising:
   a switch control circuit connected to each of the switches for controlling individual switching operations of the switches so that elements of the first and second set of switches individually place each basic cell of the series connection of basic cells in parallel connection with the voltage holder by repeatedly proceeding from the first cell to the final cell.

3. The cell balance adjusting circuit of claim 2, further comprising:
   a voltage judging circuit;

the first voltage holder switch connecting the first terminal of the voltage holder with a first side of the voltage judging circuit; and the second voltage holder switch connecting the first terminal of the voltage holder with a second side of the voltage judging circuit, the voltage judging circuit being connected repeatedly proceeding from a first cell of the series connection of basic cells to a final cell of the series connection of basic cells, via the first and second voltage holder switches, with the voltage holder after the switch control circuit connects and releases each of basic cells in parallel connection with the voltage holder, the voltage judging circuit detecting a voltage of the voltage holder after a previous one of the basic cells has been disconnected from the voltage holder and before a next one of the basic cells is connected to the voltage holder.

4. The cell balance adjusting circuit of claim 3, wherein the first and second voltage holder switches have a higher withstand voltage than the switching circuit.

5. The cell balance adjusting circuit of claim 1, wherein each switch comprises a switching transistor.

6. The cell balance adjusting circuit of claim 1, wherein each switch comprises a mechanical switch.

7. The cell balance adjusting circuit of claim 1, wherein the voltage holder comprises a capacitor.

8. The cell balance adjusting circuit of claim 1, wherein the voltage holder comprises a secondary battery cell having the same structure as the basic cells.

9. A method of adjusting a cell balance of series-connected basic cells connected to a voltage holder through a switching circuit connected to all the terminals of the basic cells, comprising the step of:

repeatedly sequentially proceeding from a first cell of the series-connected basic cells to a final cell of the series-connected basic cells to individually place each basic cell in a parallel connection with the voltage holder.

10. The method of claim 9, wherein each basic cell is placed in parallel connection with the voltage holder with the switching circuit comprising a first set of switches and a second set of switches, the first set of switches connecting a first terminal of the voltage holder with a first side terminal of each basic cell, and the second set of switches connecting a second terminal of the voltage holder with a second side terminal of each basic cell, the first and second set of switches being operated to individually place each basic cell in parallel connection with the voltage holder.

11. The method of claim 10, wherein the step of individually placing each basic cell in parallel connection with the voltage holder is executed using a switch control circuit connected to each of the switches for controlling individual switching operations of the switches so that elements of the first and second set of switches individually place each basic cell of the series connection of basic cells in parallel connection with the voltage holder by repeatedly proceeding from the first cell to the final cell.

12. The method of claim 10, wherein the step of individually placing each basic cell in parallel connection with the voltage holder is executed using a switching transistor as one of the switches.

13. The method of claim 10, wherein the step of individually placing each basic cell in parallel connection with the voltage holder is executed using a mechanical switch as one of the switches.

14. The method of claim 9, wherein the step of individually placing each basic cell in parallel connection with the voltage holder is executed using a capacitor within the voltage holder.

15. The method of claim 9, wherein the step of individually placing each basic cell in parallel connection with the voltage holder is executed using a secondary battery cell having the same structure as the basic cells as part of the voltage holder.

16. The method of claim 9, wherein the step of individually placing each basic cell in parallel connection with the voltage holder includes the further step of placing a voltage judging circuit in connection with the voltage holder after each basic cell connects with and releases from the parallel connection with the voltage holder, wherein the voltage judging circuit detects a voltage of the voltage holder.

17. The method of claim 16, wherein the step of placing a voltage judging circuit in connection with the voltage holder is accomplished via operation of a connection circuit connecting the voltage judging circuit in parallel with the voltage holder.

18. The method of claim 17, wherein the step of placing a voltage judging circuit in connection with the voltage holder is accomplished using the connection circuit with a higher withstand voltage than the switching circuit.

* * * * *